Dec. 12, 1939.  A. W. TONDREAU  2,182,886
FILM TREATING APPARATUS
Filed March 4, 1938   3 Sheets-Sheet 1
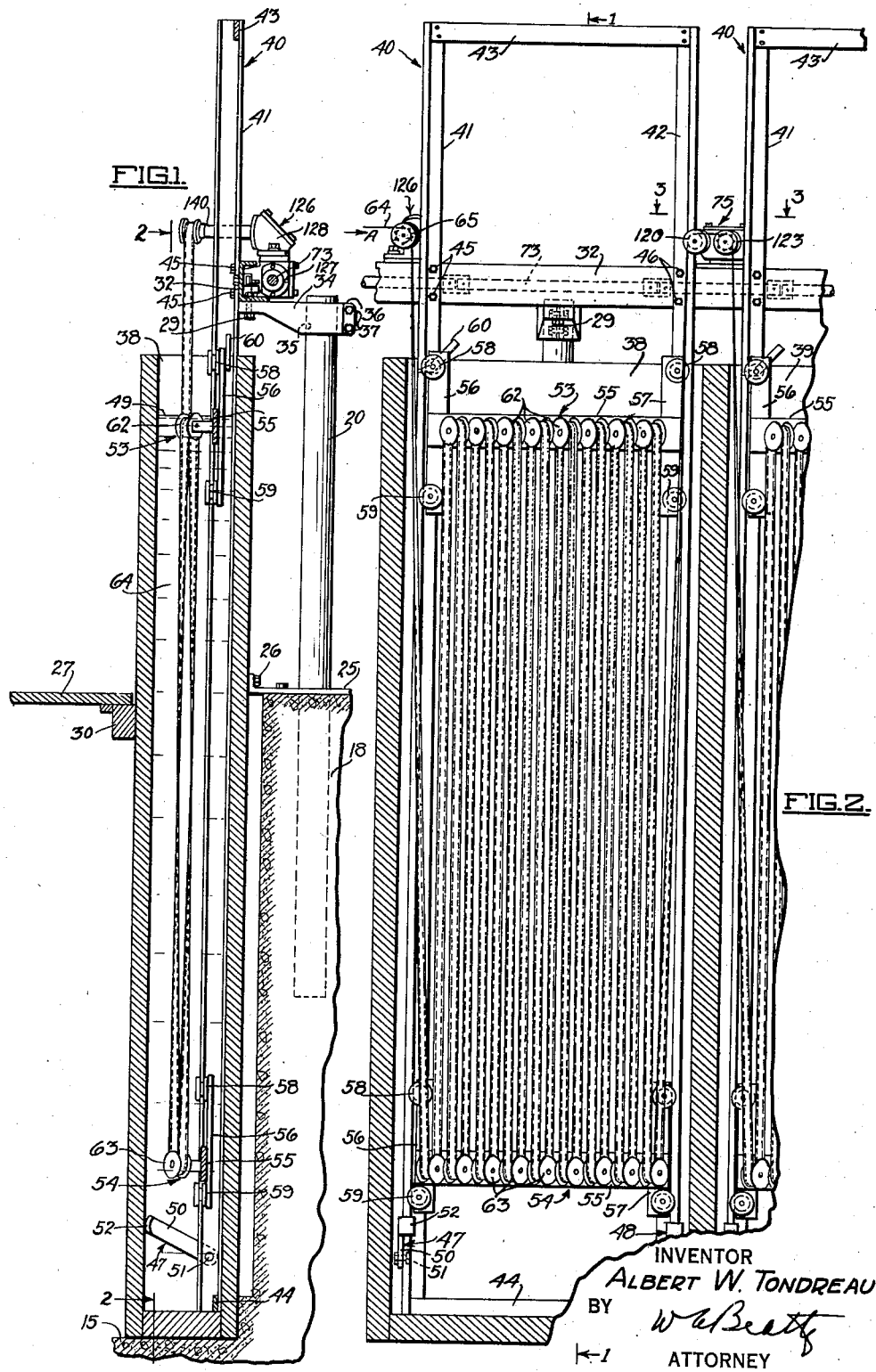
INVENTOR
ALBERT W. TONDREAU
BY
ATTORNEY Dec. 12, 1939.  A. W. TONDREAU  2,182,886
FILM TREATING APPARATUS
Filed March 4, 1938   3 Sheets-Sheet 2
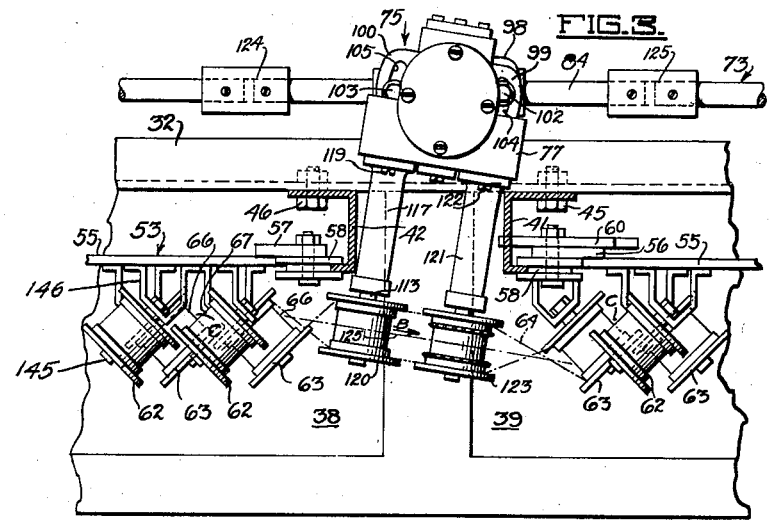
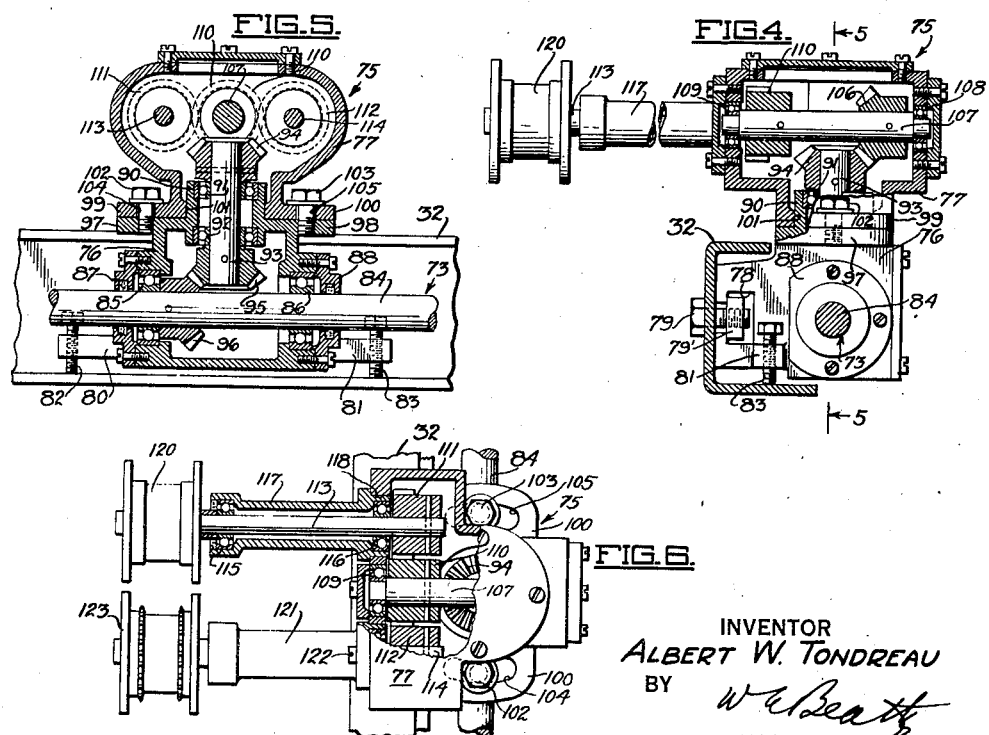
INVENTOR
ALBERT W. TONDREAU
BY
W. U. Beatty
ATTORNEY Dec. 12, 1939.   A. W. TONDREAU   2,182,886
FILM TREATING APPARATUS
Filed March 4, 1938    3 Sheets-Sheet 3
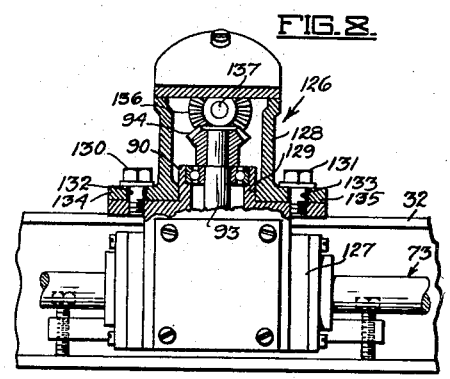
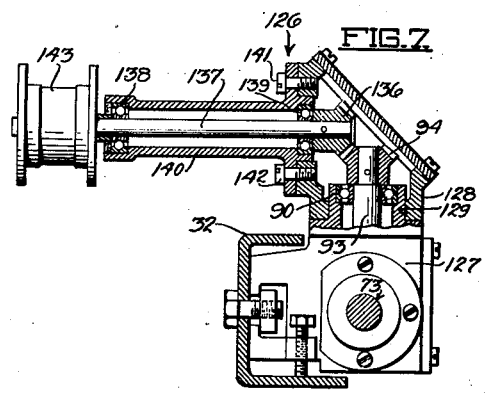
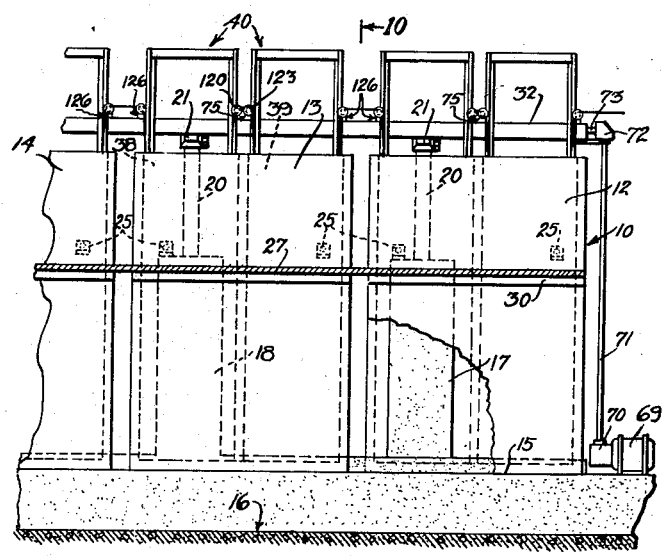
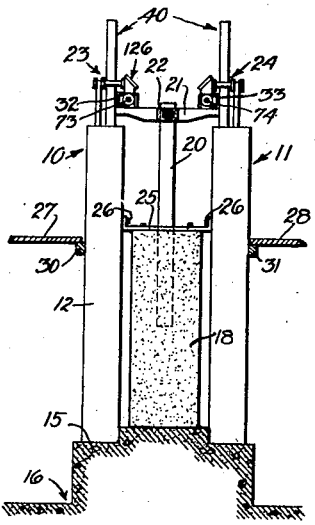
INVENTOR
ALBERT W. TONDREAU
BY
ATTORNEY Patented Dec. 12, 1939

2,182,886

UNITED STATES PATENT OFFICE 2,182,886

FILM TREATING APPARATUS

Albert W. Tondreau, Glendale, Calif., assignor to Warner Bros. Pictures, Inc., New York, N. Y., a corporation of Delaware Application March 4, 1938, Serial No. 193,966

18 Claims. (Cl. 95—94)

This invention relates to the art of treating photographic film and has particular reference to apparatus for automatically treating motion picture film in a continuous manner.

According to the present general practice of treating motion picture film, the film, after being exposed in a suitable camera, is passed in succession through a series of treating solutions to render the latent image thereon permanently visible and, if desired, colored. These various treating solutions are contained in separate tanks, suitable means being provided to guide the film in a circuitous path therein.

As the film passes through the various solutions, gelatine and other matter is removed therefrom by these solutions. These various by-products of development as well as ingredients in the solutions settle or adhere to the inner surfaces of the container tanks thus necessitating periodic cleaning of the tanks and the film guiding apparatus which is immersed in the solutions.

The film is generally driven through the various tanks by one or more sprockets located at each tank, all being driven by a common drive from a single motor to maintain a substantially synchronous speed of all parts of the film as it travels through the different solutions. The use of a common drive for the various spaced film driving sprockets necessitates the use of a considerable amount of shafting, or other rotation transmitting means, as well as bearings and supports therefor.

Heretofore, in film treating apparatus wherein the mechanism for guiding the film through the various treating solutions have been removable from their respective tanks for cleaning and repair purposes, a portion of the film driving means has generally been removable therewith. In fact, in most cases, the film driving means has comprised part of the means for guiding the film in a circuitous path through the solutions. This required disconnectible couplings intermediate permanently mounted portions of the film drive and the removable portions thereof. Furthermore, due to the relatively large size of the removable film guiding units trouble was often experienced in accurately aligning the removable and permanently mounted sections of the film drive together.

It is one object of the present invention to permanently mount the various parts of a film driving mechanism for a film treating apparatus while permitting removal of the film guiding mechanism therefor from the film treating solutions.

A further object of the invention is to permit removal of a film treating tank and film guiding mechanism therefor without disturbing the mechanism for driving film therethrough.

A further object of the invention is to permit accurate alignment of a plurality of spaced drive shaft bearings for a film drive shaft.

A further object of the invention is to permit ready access to the various parts of a film treating apparatus.

A further object of the invention is to simplify the support of the various mechanisms of a film treating apparatus.

A further object of the invention is to prevent side thrust of an elongated film while passing over a plurality of spaced spools and/or while passing from one film treating compartment to another.

A further object is to facilitate alignment of various film guiding and driving spools of a film treating apparatus.

The manner in which the above and other objects of the invention are accomplished will be readily understood by reference to the following specification read in conjunction with the accompanying drawings wherein:

Fig. 1 is a transverse sectional view through a film treating apparatus embodying my invention and is taken along the line I—I of Fig. 2.

Fig. 2 is a longitudinal sectional view of the film treating apparatus and is taken along the line 2—2 of Fig. 1.

Fig. 3 is a sectional plan view illustrating a form of film drive unit for passing a film between a pair of juxtaposed, closely adjacent film treating tank sections and is taken along the line 3—3 of Fig. 2.

Fig. 4 is a side view, partly in section, of the film drive unit illustrated in Fig. 3.

Fig. 5 is a sectional view through the film drive unit and is taken along the line 5—5 of Fig. 4.

Fig. 6 is a plan view, partly in section, of the film drive unit.

Fig. 7 is a side view, partly in section, of another form of film drive unit for passing a film between a pair of widely spaced film treating tank sections.

Fig. 8 is a view, partly in section, taken transversely of that of Fig. 7.

Fig. 9 is an elevational view of a row of film treating tanks and associated mechanism.

Fig. 10 is a transverse sectional view taken along the line 10—10 of Fig. 9.

Referring now to Figs. 9 and 10, the film treating apparatus illustrated therein comprises two rows of parallel film treating tanks or compartments 10 and 11 spaced from each other and arranged in a back to back relation. Each row of tanks comprises a set of narrow vertically extending tanks 12, 13, 14, etc., aligned edge to edge. These various tanks rest on the stepped portion 15 of a concrete floor or foundation 16.

A plurality of vertically extending columns 17, 18, etc., of concrete or the like, are spaced along the stepped portion 15 intermediate the rows of tanks 10 and 11. A cylindrical post 20 is embedded in each column, this post extending upwardly therefrom and terminating in a cross arm 21. Cross arm 21 is attached to the post 20 by a split sleeve connection 22 formed on the cross arm 21 whereby the arm 21 may be clamped in different positions vertically along the post 20. Each cross arm 21 supports at its opposite ends the film driving and guiding mechanisms generally indicated at 23 and 24 (Fig. 10) for the respective tanks.

Tanks 12, 13 etc. merely rest upon the stepped portion 15 of the foundation 16 and each set of opposed tanks is removably secured together through suitable ties 25 secured at either end thereof by bolts 26 to the adjacent sides of the opposed tanks. Floor sections 27 and 28 are provided on either side of the rows of film tanks 10 and 11, respectively, to permit easy access to the various film driving and guiding mechanisms 23 and 24. These floor sections are removably supported on beams 30 and 31 which are secured to the sides of the various opposed tanks 12, 13 etc.

The various film guiding and driving mechanisms 23 and 24 are supported by the cross arms 21 through channel or cross members 32 and 33 extending directly above and longitudinally of the rows of tanks 10 and 11, respectively, to form supporting members.

Figs. 1 and 2 illustrate a modification of the support for the film guiding and driving mechanisms where only a single row of film treating tanks are used. In this case the horizontally extending channel 32 is supported from each post 20 by means of a cantilever arm 34 and is secured thereto by suitable bolts as at 29. Arm 34 has a bore 35 therein and a split sleeve formation 36 permitting the arm 34 to be clamped in different positions along the post 20 by a pair of clamp bolts 37. The various film driving and guiding mechanisms, however, in Figs. 1 and 2 are the same as those illustrated in Figs. 9 and 10.

Each tank 12, 13 etc. constitutes a pair of tanks or tank sections 38 and 39 containing a suitable film treating solution. For example, the first tank section may contain a developing solution, the next a rinsing solution, the next a hypo or fixing solution, the next a rinsing solution, the next a dye toning solution, etc. A film guiding unit is removably supported in each of the tank sections 38 and 39 and comprises a rectangular frame, generally indicated at 40. Frame 40 comprises a pair of spaced upright channel members 41 and 42 secured in spaced relation with each other by upper and lower cross beams 43 and 44, respectively. These frames rest on the bottom of their respective tank sections and are removably secured to the longitudinally extending channel member 32 by bolts 45 and 46. A pair of toggle shoes 47 and 48 are provided at the lower ends of the channel members 41 and 42, respectively, to removably clamp the frame 40 in its tank section at the lower end thereof. Each of these toggle shoes comprises a lever 50, pivoted at 51 at one end thereof, and having a flange 52 at the opposite end thereof adapted to engage the adjacent side of the tank section to wedge the lower part of the frame 40 against the back wall of the tank section. When the frame 40 is to be removed from the tank, the levers 50 may be raised upwardly by a suitable hooked rod (not shown) thus disengaging the lower end of the frame.

If the tanks are constructed of wood, each tank is tilted rearwardly slightly so that the top edge of the inner surface of the back wall thereof is separated a small amount, say three-eighths of an inch, to permit warping or swelling of the wood without causing misalignment of the frame 40 thereby.

A pair of upper and lower spool heads 53 and 54, respectively, are vertically reciprocal along the channel members 41 and 42 of each of the frames 40. Each of these spool heads comprises a spool bar 55 having cross heads 56 and 57 at either end thereof. Grooved guide rollers 58 and 59 are rotatably mounted at either end of each cross head 56 and 57 and ride along the outer flanges of the upright channel members 41 and 42 to guide the spool heads therealong. A latch member 60, pivotally supported on the shaft of the upper guide roller 58 of the cross head 56 on the upper spool head 53 is adapted to engage a suitable notch (not shown) in the channel member 41 to lock the spool head 53 in a fixed position and submerged in the film treating solution 49. By moving the latch 60 in a counter clockwise direction to release the same from the notch in the channel member 41, the spool head 53 may be raised vertically along the members 41 and 42 to an upper position, permitting the lower spool head 54 to be raised clear of the film treating solution 49. In fact it may be removed entirely from the frame 40. A latch similar to that of 60, may be attached to the lower spool head 54 to permit the same to be locked in a position above the level of the film treating solution 49 for threading purposes.

Film guiding spools 62 are rotatably mounted on the bar 55 of spool head 53 with their axes lying in a common horizontal plane but at 45° to the length of the spool head 53. Each of these spools is mounted on a separate stub shaft 145 suitably supported from the bar 55 by an angle bracket 146. A row of similar film guiding spools 63 are rotatably mounted on the corresponding bar of the lower spool head 54 with their axes also lying in a common horizontal plane but at 90° to the axes of the upper spools 54. Furthermore, as will be described hereinafter, the center of the periphery of the take-off side of each lower spool 63 is in direct vertical alignment with the center of the periphery of the take-on side of an upper spool with the exception of the last spool. The film 64 to be treated passes in the direction of the arrow "A" over the drive sprocket 65 before entering the tank section 38 and thence is threaded in a plurality of sinuous loops around the various upper and lower sets of spools 62 and 63. The film 64 is so threaded that the emulsion surface thereof remains out of contact with the periphery of all of the spools 62 and 63 while passing thereover. By retaining the upper spools 62 in a submerged position, oxidation of the various film treating solutions, especially the film developing solution, is reduced.

It will be noted on reference to Fig. 3 that the size and spacing of the various sets of upper and lower spools 62 and 63, respectively, are such that the path of the film 64 as it passes from a lower spool 63 to an upper spool 62 is at right angles to the axis of rotation of both of these film spools. That is, the film as it passes from the periphery of the take-off side 66 of a lower spool 63 to the periphery of the take-on side 67 of the next upper spool 62 passes in a vertical direction and although it twists about an angle of 90°, the right angle relation above described results in the center of the periphery "C" of each upper spool 53 being in direct alignment with the corresponding center of the periphery of the aligned lower spool 54. Thus the film as it passes in a series of sinuous loops is restrained from side thrust.

The above described angular arrangement of film guiding spools for guiding a film between spaced film spool heads is disclosed and claimed in U. S. Patent to A. W. Munson No. 2,133,109, dated October 11, 1938.

I will now describe the mechanism for driving the film successively through the various film treating tanks. As shown in Fig. 9 a single motor 69 is provided to drive the various film driving mechanisms of the row of tanks 10. Motor 69 is connected through a gear box 70, a vertically extending shaft 71, and a second gear box 72, to a multi-section drive shaft 73 extending longitudinally of the row of tanks 10. A similar drive shaft 74 (Fig. 10) extending longitudinally of the row of tanks 11 is driven by a similar motor and drive connections (not shown).

At the point intermediate the two tank sections 38 and 39 of each of the tanks 12, 13 etc. a film drive unit, generally indicated at 75, (Figs. 3 to 6, inclusive) is employed. The film drive unit 75 comprises a lower gear housing 76 and an upper gear casing 77 supported thereby. The gear housing 76 is supported by the channel member 32 through a single bolt 79 (Fig. 4). Bolt 79 extends through the web of the channel member 32 and into a T-slot 78 formed in the housing 76 and extending the length thereof. A nut 79' on bolt 79 and located in slot 78 is provided to clamp the housing 76 in position against the web of channel member 32. It will be noted that the T-slot 78 has a width larger than the nut 79' and the body portion of the bolt 79 to permit vertical adjustment of the housing 76 relative to this bolt. A pair of bosses 80 and 81 integrally formed on either side of the housing 76 have a pair of adjusting screws 82 and 83, respectively threaded therein. Screws 82 and 83 engage the lower flange of channel 32 and are provided to impart a vertical adjustment of the gear housing 76 and/or a tilting adjustment thereof substantially about the bolt 79. By adjusting all of the housings 76 in this manner the various sections of shaft 73 may be brought into correct axial alignment.

A shaft section 84 comprising part of the multi-sectional drive shaft 73 is rotatably mounted in ball bearings 85 and 86 carried at either end of the housing 76. Caps 87 and 88 are provided to retain the bearings 85 and 86, respectively, in their proper positions. These caps also form seals to retain lubricant within the housing 76. An annular projection 90 is formed at the top of the housing 76 and is counterbored at either end thereof to receive ball bearings 91 and 92 therein. These bearings rotatably support a stub shaft 93 having bevel gears 94 and 95 securely mounted at either end thereof. The lower gear 95 meshes with a similar gear 96 secured on the drive shaft section 84.

Flanges 97 and 98 at the top of the housing 76 form a supporting surface for a similar pair of flanges 99 and 100, respectively, formed on the upper gear casing 77. Casing 77 has a bore 101 therein fitted over the outer circumference of the projection 90 permitting the upper casing 77 to be adjusted in position about the axis of the shaft 93. A pair of clamp screws 102 and 103 extend through arcuate slots 104 and 105, respectively, formed in the flanges 99 and 100, respectively, and are threaded in the flanges 97 and 98, respectively, of the housing 76. Slots 104 and 105 are concentric with the shaft 93. Housing 76 thus forms a supporting member for the casing 77.

Gear 94 on shaft 93 meshes with a similar gear 106 secured to horizontally extending stub shaft 107, rotatably mounted in ball bearings 108 and 109 carried by the upper gear casing 77. A spur gear 110 secured on the forward end of the shaft 107 meshes at either side thereof with spur gears 111 and 112 secured to the ends of film spool shafts 113 and 114, respectively. Shaft 113 is rotatably mounted in ball bearings 115 and 116 mounted in a tubular bearing support 117. Support 117 is mounted in an opening 118 formed in the wall of the upper gear housing 77 and is secured thereto by screws, one of which is shown at 119 (Fig. 3). A film spool 120 is secured in any suitable manner at the outer end of the shaft 13 to assist in driving the film thereover. Shaft 114 is supported in a like manner in a tubular bearing support 121 which is secured by screws, on of which is shown at 122 to the wall of the housing 77 on the opposite side of the gear 110. A toothed film driving spool or sprocket 123 is secured on the outer end of the shaft 114 to drive a film thereover.

Referring to Fig. 3 the gear unit 75 s preferably so positioned that the center line of the film path formed thereby, as indicated by the dot and dash lines 125, intersects the center of the periphery of the take-off side of the last lower film spool 63 in the tank section 38 and also the center of the periphery of the take-on side of the first lower film spool 63 in the tank section 39, it being assumed that the film is to travel in the direction of the arrow B. This position may be obtained by loosening the clamp screws 102 and 103 on either side of the gear housing 77 and then changing the angular position of the housing about the annular projection 90. Furthermore, since the T-slot 78 (Fig. 4) in casing 76 extends the length of the casing, the casing may be moved along the channel member 32 on loosening the bolt 79 to effect the correct positioning of the spool 120 and sprocket 123 relative to the film spools in the tank sections 38 and 39. It will be noted that the last lower spool 63 in the tank section 38 is spaced laterally from the driven spool 120, thus permitting the lower spool head 54 to be raised entirely out of the tank section 38 and, in fact, it may be raised entirely clear of the frame 43 without disturbing the setting of the drive unit 75. The first lower spool 63 in the tank section 39 is similarly displaced from the sprocket 123 to permit the lower spool head 54 in that section to also be raised past the unit 75 without interference therewith.

It will be noted that the shaft section 84, journalled in the lower gear housing 76, is removably coupled to the adjacent sections of the drive shaft 73, through couplings 124 and 125, thus permitting the entire unit 75 to be removed for repairs or replacement. Furthermore, these couplings 124 and 125, when loosened, permit the shaft section 84 to be moved in an axial direction with the unit 75 for the purpose of correctly aligning the spool 120 and sprocket 123.

Figs. 7 and 8 illustrate another form of film drive unit, generally indicated at 126. This type is employed where the distance between film tank sections is relatively large as between different tanks 12 and 13 (Fig. 9). In this case, one unit 126 is situated adjacent the exit side of one tank section and a similar unit is situated adjacent the entrance side of the next adjacent tank section. This unit 126 comprises a lower gear housing 127, identical with that of 76, and also secured to the web of the channel member 32. An upper gear casing 128 has a bore 129 therein fitted over the central annular projection 90 of housing 127 and is secured to the upper surface of housing 127 by clamp screws 130 and 131, similar to those of 102 and 103. Screws 130 and 131 extend through arcuate slots 132 and 133, respectively, formed in flanges 134 and 135, respectively, projecting on either side of the casing 128. The gear 94 on shaft 93 meshes with a similar gear 136 secured at the end of a spool shaft 137 which is rotatably mounted in ball bearings 138 and 139, carried in a tubular bearing support 140. Support 140 is secured to the housing 128 by screws 141 and 142. A film driving spool 143 is secured at the outer end of the shaft 137 to drive the film thereover. Preferably, on those units 126 adjacent the exit of a tank a film spool as shown at 143 is employed whereas on those units 126 adjacent the entrance of a film tank a toothed sprocket similar to that of 123 (Fig. 6) is employed.

The feature of supporting a film driving spool for adjustment in position about a drive shaft therefor and extending at right angles thereto is broadly disclosed and claimed in my copending application, S. N. 190,237, filed February 12, 1938.

When it is necessary to remove either a guide frame 49 from its respective tank, or to remove both the guide frame 49 and its respective tank, the bolts 45 and 46 (Figs. 2 and 3) securing the frame 43 to the channel member 32, are removed and the toggle shoes 47 and 48 are released as hereinbefore described, permitting the entire frame with the spool heads thereon to be removed vertically from its tank without disturbing the setting of the various film driving spools and their associate gear mechanism. In removing the tanks themselves, the bolts 26 of the various ties 25 are removed as well as the adjacent floor sections 27 or 28, permitting the tank to be lifted clear of the foundation 16 for the purpose of cleaning, replacement, or the like.

I claim:

1. Film apparatus comprising the combination of a tank adapted to contain a film treating fluid, means for removably supporting said tank, a frame in said tank, means on said frame for guiding a film in a predetermined path through said tank, a channel member, a cross arm above said tank for supporting said channel member, a post at one side of said tank for supporting said cross arm means for removably securing said frame to said channel member, film driving means exteriorly of said tank, means for mounting said film driving means on said channel member, and a drive shaft for said film driving means in said channel member.

2. Film treating apparatus comprising the combination of a foundation having an upwardly extending projection, a tank adapted to contain a film treating fluid removably supported on said foundation on one side of said projection, means in said tank for guiding a film therethrough, means on said projection for supporting said film guiding means, means for driving said film through said tank, a drive shaft for said film driving means and means on said projection for supporting said film driving means and said drive shaft independently of said tank and said film guiding means whereby said tank and said film guiding means may be removed independently of said film driving means and said drive shaft.

3. Film treating apparatus comprising the combination of a tank adapted to contain a film treating fluid, a frame including a pair of spaced upright members, a pair of spool heads vertically spaced along said members and adapted to guide a film in a predetermined path through said tank, means for removably supporting said frame in said tank, a film driving element above said tank for driving said film through said tank, means for driving said element, and means for supporting said film driving element and said driving means independently of said frame.

4. Film apparatus comprising the combination of a film treating compartment, a frame, means on said frame for guiding film in a predetermined path through said compartment, a support for removably supporting said frame in said compartment, a film driving element above said compartment and adapted to drive said film through said guiding means, means for driving said element, and means independent of said frame for mounting said film driving element and said driving means on said support independently of said frame whereby said frame may be removed from said compartment without disturbing said film driving element and said driving means.

5. Film treating apparatus comprising a row of film treating tanks, means for removably supporting said tanks, a frame in each of said tanks, means on each of said frames for guiding an elongated film to be treated through its respective tank in a predetermined path, a supporting member extending longitudinally of said row, means for supporting said member independently of said tanks, means for removably mounting said frames on said supporting member, a drive shaft, means on said member for rotatably supporting said shaft, a film driving element individual to each of said tanks for driving said film successively through said tanks, means for mounting each of said film driving elements on said supporting member independently of said frames, and a driving connection between each of said film driving elements and said drive shaft.

6. Film apparatus comprising a supporting member, an annular projection formed on said supporting member, said projection having a bore, a shaft, means for journaling said shaft in said bore, a gear on one end of said shaft, a gear casing enclosing said gear, said casing having a bore therein fitted over said annular projection, means for securing said casing in different positions about said projection, a second shaft extending at an angle to said first mentioned shaft, means for rotatably mounting said second shaft in said casing, a gear on said second shaft meshing with said first mentioned gear, a film driving element, and an operative connection between said element and said second shaft.

7. Film apparatus comprising a supporting member, an annular projection formed on said supporting member, said projection having a bore, a shaft, means for journaling said shaft in said bore, a casing having a bore therein fitted over said annular projection, means for locking said casing in different positions around said projection, a pair of spool shafts, means for rotatably mounting said spool shafts in said casing at right angles to said first mentioned shaft, each of said shafts having one end thereof extending exteriorly of said casing, an operative connection between said first shaft and said spool shafts, and film driving spools secured on the exteriorly extending end portions of said spool shafts.

8. Film apparatus comprising a supporting member, a cylindrical projection on said supporting member, said projection having a bore therein concentric therewith, a shaft rotatably mounted in said bore and terminating in a bevel gear, a gear casing enclosing said gear and having a bearing bore therein fitted over the exterior of said projection, means adapted to lock said casing in different positions around said projection, a second shaft at right angles to said first mentioned shaft with the axis thereof intersecting the axis of said first mentioned shaft, a bevel gear on said second shaft meshing with said first mentioned gear, a pair of parallel spool shafts, means for rotatably mounting said shafts in said casing with one end of each of said shafts extending exteriorly of said casing, operative connections between said spool shafts and said second shaft, film driving spools secured on the exteriorly extending portions of said spool shafts and means for driving said first mentioned shaft.

9. Film apparatus comprising a plurality of uprights arising from the floor, a cross arm carried by each of said uprights, a U-shaped member carried by said cross arms, a plurality of spaced drive shaft bearings carried by said member, a sectional drive shaft carried by said bearings, a film treating compartment, and spaced film spools coupled to said drive shaft and adapted to propel film through said compartment.

10. Film treating apparatus comprising a bearing housing, a bearing for a vertical stub shaft in said housing, a bearing in said housing at each side of said stub shaft for supporting a horizontal drive shaft, gears in said housing coupling said drive shaft to said stub shaft, a casing on said housing, a gear on said stub shaft in said casing, a bearing in said casing at each side of said stub shaft for supporting a horizontal film spool shaft, gears in said casing coupling said spool shaft to said last mentioned gear, a film spool on said spool shaft, a film treating compartment having a film spool, and means for rotatably securing said casing to said housing to permit adjustment of the angular relation of said spools.

11. Film apparatus comprising the combination of a pair of film treating compartments, a drive shaft, a film spool coupled to said drive shaft and adapted to receive film from one of said compartments, a second film spool coupled to said drive shaft and adapted to receive film from said first mentioned spool and guide the same to said second compartment, a common support for said film spools and means for varying the angular position of said support relative to said drive shaft while said spools are coupled to said drive shaft.

12. Film apparatus comprising the combination of a film treating compartment, a spool head therein, an exit spool on said spool head rotatable about an axis of 45° to the length of said spool head, a second film treating compartment, a second spool head therein, and an entrance film spool on said second spool head rotatable about an axis at 45° to the length of said second spool head; a drive shaft, a pair of spools coupled thereto for guiding film between said exit film spool and said entrance film spool, and common means for angularly adjusting said pair of film spools with respect to said drive shaft.

13. Film treating apparatus comprising a horizontal drive shaft, means for rotatably supporting said shaft, a vertical stub shaft above said drive shaft and geared thereto, a horizontal stub shaft geared to said vertical stub shaft, a horizontal film spool shaft at each side of said horizontal stub shaft and geared thereto, a film spool for each of said spool shafts, a film treating compartment having means for supplying film to one of said spools, and a second film treating compartment having means for receiving film from the other of said spools.

14. Film treating apparatus according to claim 13 comprising a bearing housing for said drive shaft and said vertical stub shaft, a casing for said horizontal stub shaft and said spool shafts, means supporting said casing for rotation with respect to said housing about the axis of said vertical stub shaft and means for securing said casing to said housing.

15. Film apparatus comprising the combination of a plurality of aligned spaced posts arising from the floor, a cross arm on each of said posts, means for adjusting the position of each of said cross arms on its respective post, said cross arms being substantially parallel with each other and extending from one side of their respective posts, a cross member substantially parallel to the line of said posts and carried by said cross arms at one side of said posts, a drive shaft rotatably carried by said cross members, a plurality of tanks associated with said drive shaft, and film spools coupled to said drive shaft for driving film through said tanks.

16. Film apparatus comprising a film tank, a frame in said tank, spool heads on said frame for guiding a film through said tank, and a toggle shoe on said frame and engaging one wall of said tank for supporting said frame against an opposite wall of said tank.

17. A film treating apparatus comprising in combination, a tank adapted to contain a film treating liquid, a removable unitary frame comprising stationary upright guides in said tank, a lower spool head normally below the liquid level of said tank and movable along said guides, stub spool shafts on said spool head arranged at 45° to the length of said spool head, an upper spool head of idler spools having their axes at 90° to said stub shafts, said upper spool head being normally secured to said guides with said idler spools submerged in said tank and independent of said lower spool head, a drive shaft behind said guides, a film spool at one side of one of said guides for leading film to the tank, the center line of said film spool being aligned with the center line of the leading spool of said lower spool head, a coupling between said last mentioned spool and said shaft, a film spool at the side of the other of said guides for traversing film between said spool heads, the center line of said last mentioned film spool being aligned with the center line of the last film spool on said lower spool head, a coupling between said last mentioned spool and said shaft, said upper spool head being movable upwardly on said guides to allow said lower spool head to be independently raised along said guides above the liquid level of said tank.

18. Film apparatus comprising a film tank, a frame in said tank, spool heads on said frame, means outside said tank for holding the top of said frame closely adjacent one wall of said tank, and a toggle at the lower end of said frame for holding the lower end of said frame adjacent the same wall.

ALBERT W. TONDREAU.